Figure 1:
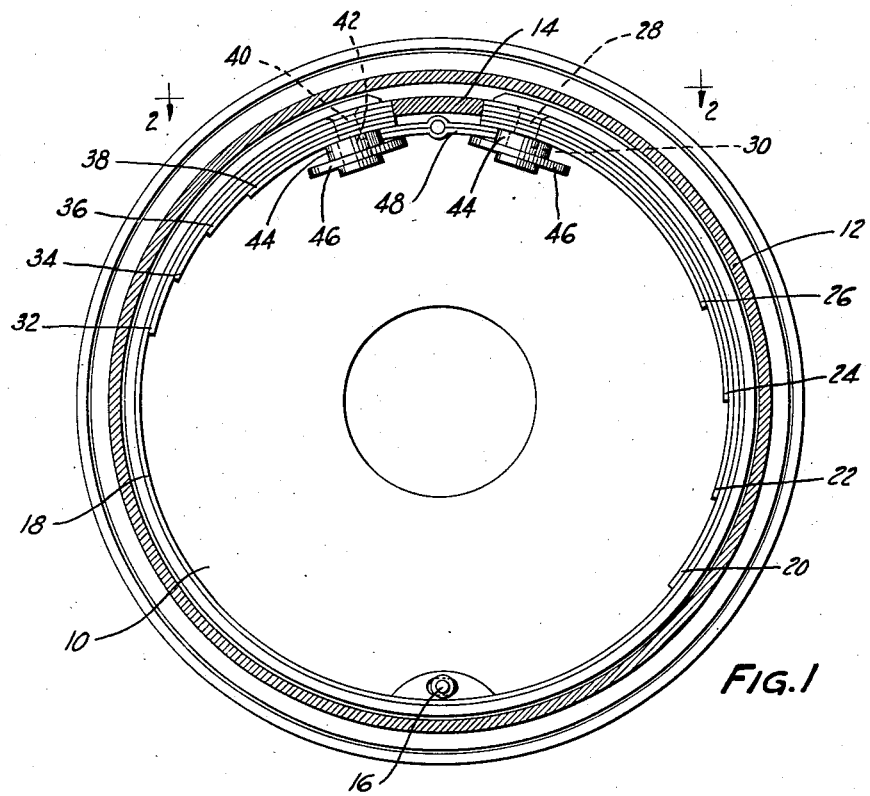

Aug. 27, 1935.    R. A. GOEPFRICH    2,012,663

BRAKE

Filed Jan. 8, 1931

INVENTOR.
RUDOLPH A. GOEPFRICH
BY
ATTORNEY

Patented Aug. 27, 1935

2,012,663

UNITED STATES PATENT OFFICE 2,012,663

BRAKE

Rudolph A. Goepfrich, South Bend, Ind., assignor to Bendix Brake Company, South Bend, Ind., a corporation of Illinois Application January 8, 1931, Serial No. 507,341

10 Claims. (Cl. 188—78)

This invention relates to brakes and more particularly to internal expanding brakes.

Briefly, the invention comprehends the provision of a laminated internal band adaptable for co-operation with the braking surface of the drum, so that the band may conform to any distortion of the braking surface of the drum due to localized pressures.

An important object of the invention is a plurality of band sections interposed one upon the other and arranged in graduated sizes, so that the separable ends of the band may be built up to stiffen the end portions so that the total coefficient of friction between the band and the drum may be more effective.

In the illustrated embodiment of the invention, a band having separable ends is provided upon one end with relatively long superimposed band sections, whereas the other end is provided with a plurality of relatively short superimposed band sections, so that the pressure applied to one end of the friction element together with the wiping action of the drum may be more effectively utilized at the anchoring end of the fricion element by reason of stiffening this portion of the element.

A salient feature of the invention is a laminated friction element.

Another feature of the invention is a friction band having superimposed sections of varying length.

A further feature of the invention is a band friction element having a plurality of relatively long superimposed sections of varying length on one end and a plurality of relatively short superimposed sections varying in length on the other end.

Figure 2:
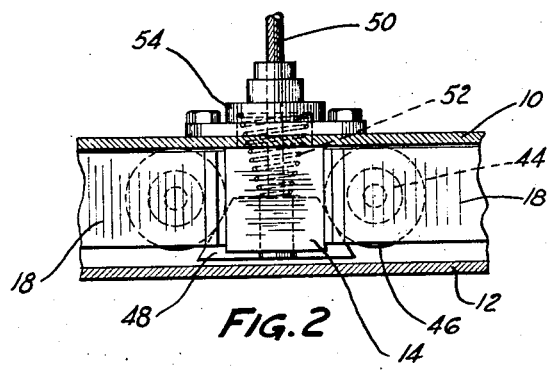

Other objects and features of the invention will appear from the following description taken in connection with the drawing, which forms a part of this specification, and in which:

Figure 1 is a vertical sectional view taken just back of the head of the drum, illustrating the friction element in side elevation; and Figure 2 is a sectional view substantially on line 2—2, Figure 1.

Referring to the drawing for more specific details of the invention, 10 represents a fixed support such as a backing plate. The backing plate has associated therewith a rotatable drum 12. Positioned on the backing plate is a fixed anchor 14 and a suitable steady rest 16. A band friction element 18 is supported on the backing plate by the steady rest 16. This friction element has arranged on its separable ends superimposed band sections.

As shown, one end of the band 18 has positioned thereon a plurality of relatively long band sections 20, 22, 24 and 26 of varying length, the band sections being secured together by a rivet 28 having an enlarged head 30, the object of which will hereinafter appear. The other end of the band is provided with a plurality of relatively short band sections 32, 34, 36 and 38 secured together by a rivet 40 having an enlarged head 42.

Positioned for rotation on the heads 30 and 42 of the rivets are rollers 44 and 46. The rollers 44 and 46 are rotatably mounted on the rivet heads 30, which are flanged over at their inner ends to hold the rollers in place. These rollers, together with the respective ends of the shoes, provide suitable guides for an operating member 48 movable transversely with respect to the band by a tension member 50 having positioned thereon a coil spring 52 between the operating member 48 and a suitable bracket 54 secured on the backing plate. The rollers 46 function as a guide for the operating member 48 and also serve to retain the friction band in proper spaced relation to the backing plate with free movement thereon.

The band 18, due to its resiliency, returns upon release of applied pressure on the operating member to the off position, and when in this position, the band supports itself in proper spaced relation to the braking surface of the drum.

In operation, force is applied to the operating member to spread the separable ends of the friction element into engagement with the drum. This applied force is augmented by the wiping action of the drum and as the applied pressures are built up toward the anchoring end of the drum, the laminated portions on the anchoring end serve to stiffen the band to take care of these accumulated pressures.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patents is:

1. A brake comprising a flexible friction element having separable ends and superimposed band sections of varying length on the respective ends.

2. A brake comprising a band section having separable ends, short band sections of varying length superimposed on one end and relatively long band sections of varying length superimposed on the other end.

3. A brake comprising a band having separable ends, superimposed band sections arranged upon the respective ends, means securing the sections together and means co-operating with the securing means for spreading the band.

4. A brake comprising a band having separable ends, superimposed band sections of varying length upon the respective ends, means for securing the band sections together and means carried by the securing means for supporting an applying device.

5. A brake comprising a band having separable ends, superimposed band sections of varying length upon the separable ends, means for securing the band sections on the band and rollers on the securing means adaptable for supporting the band.

6. A brake comprising a band having separable ends, a plurality of band sections of varying length supported on the respective ends of the band, the band sections on one end of the band being longer than the band sections on the other end of the band, means for securing the band sections on the band, rollers supported by the securing means in spaced relation to the respective ends of the bands and means cooperating with the rollers for spreading the band.

7. A brake comprising an anchor and a friction element shiftable to anchor thereagainst alternatively at one end or the other and which is in the form of a band thickened some distance from each end by a plurality of laminations to decrease its flexibility.

8. A brake comprising a friction element shiftable to anchor alternatively at one end or the other and which is in the form of a band thickened some distance from each end by a plurality of laminations to decrease its flexibility.

9. A brake comprising a friction element shiftable to anchor alternatively at one end or the other and which is in the form of a band thickened some distance from at least one end by a plurality of laminations to decrease its flexibility.

10. A brake comprising a laminated friction band having a fastening device securing the laminations and which device is provided with an operating roller rotatably arranged flatwise on the inner face of the band.

RUDOLPH A. GOEPFRICH.